(12) United States Patent
Maier et al.

(10) Patent No.: US 8,171,058 B2
(45) Date of Patent: May 1, 2012

(54) ONE CLICK CREATION OF LINKAGES BETWEEN MASTER DATA RECORDS

(75) Inventors: Albert Maier, Tuebingen (DE); Martin Oberhofer, Bondorf (DE); Thomas Schwarz, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/416,007

(22) Filed: Mar. 31, 2009

(65) Prior Publication Data

US 2010/0250620 A1 Sep. 30, 2010

(51) Int. Cl.
*G06F 7/00* (2006.01)
*G06F 17/30* (2006.01)

(52) U.S. Cl. .................. 707/802; 707/804; 707/805

(58) Field of Classification Search .................. 707/802, 707/805, 804
See application file for complete search history.

(56) References Cited

U.S. PATENT DOCUMENTS

| | | | | |
|---|---|---|---|---|
| 5,379,366 A | * | 1/1995 | Noyes | 706/55 |
| 5,870,746 A | * | 2/1999 | Knutson et al. | 707/101 |
| 6,957,230 B2 | * | 10/2005 | Cameron et al. | 707/103 R |
| 2002/0083192 A1 | * | 6/2002 | Alisuag | 709/237 |
| 2006/0190391 A1 | | 8/2006 | Cullen et al. | |
| 2007/0214179 A1 | * | 9/2007 | Hoang | 707/104.1 |
| 2008/0069132 A1 | | 3/2008 | Ellard et al. | |
| 2008/0215367 A1 | * | 9/2008 | Marshall | 705/3 |
| 2009/0018996 A1 | | 1/2009 | Hunt et al. | |

* cited by examiner

*Primary Examiner* — John R. Cottingham
*Assistant Examiner* — Mariela Reyes
(74) *Attorney, Agent, or Firm* — Sughrue Mion, PLLC (57) ABSTRACT

A method and system for creating interrecord relationships between master data records stored in a relational database are provided. The method includes receiving information for a first master data record from a user, searching a plurality of master data records in the relational database for candidates that have a potential of being related to the processed master data record, the searching performed automatically in response to the receiving, determining at least one possible relationship type between the candidates found as a result of the searching and the first master data record, and presenting the at least one possible relationship type and the candidates found as a result of the searching to the user. The disclosed method and system allow a user to create and maintain relationships between multiple master data records with minimal steps.

20 Claims, 5 Drawing Sheets

ONE CLICK CREATION OF LINKAGES BETWEEN MASTER DATA RECORDS

BACKGROUND OF THE INVENTION

1. Field of the Invention

The present invention generally relates to a method and apparatus for providing a user interface, and more specifically to provide a user interface for a driven creation of linkages between master data records in a master data authoring user interface connected to a master data management system.

2. Description of the Related Art

Examples of links or linkages include relationships between customers (e.g., Person A is spouse of Person B, Person B is a child of Person C, Person A is an employee of Company X, Department G is department of Company X, Company X is managed by Person A, etc.), between products (e.g., is a part of, etc.), and between accounts/contracts and customers (e.g., Person D is a contract owner, Person E is a beneficiary, Person F is a premium payer, Person G is the subject of a contract, etc.). Conventional linkage solutions require multiple steps to create a single relationship. For example, the following process describes a customer master data domain:

Step 1. Navigate to the first customer of the relationship;
Step 2. Do action to add relationship;
Step 3. Select type of relationship;
Step 4. Do "action, i.e., search for second customer;"
Step 5. Enter customer search criteria;
Step 6. Do "perform search;"
Step 7. Select second customer record; and
Step 8. Add the new relationship.

This is, in the conventional process, for a given customer, at least 7 steps are required after the navigation step (Step 1) is completed to create a single relationship linkage. As a result, the conventional process has many steps that have to be repeated for each relationship, thereby making the conventional linking of people time consuming and error prone because the results depend also on search criteria that is manually entered.

SUMMARY OF THE INVENTION

In view of the foregoing, and other, exemplary problems, drawbacks, and disadvantages of the conventional systems, it is an exemplary feature of the present invention to provide a method to create interrecord relationships between master data records, the master data records having a relational database for storing master data entities, the method including processing a master data record which encompasses two cases of receiving a new master data record as well as editing an existing master data record, determining a role of a user processing a master data record and ending the method if the user does not possess an adequate authorization, searching a plurality of master data records in the relational database for candidates that have a potential of being related to the processed master data record, the searching being performed implicitly and the searching comprising a search parameter having context information, determining at least one of an implicit and potential appropriate relationship type related to the processed master data record for each of the potential candidates, providing an interface to the user for determining the interrecord relationships between the processed master data record and each candidate master data record, the user interface providing a list of master data record candidates possibly related to the processed master data record for establishing the interrecord relationship via a single click, and persisting a newly determined relationship in the master data record.

As a result, only one step, per relationship, is exemplarily required instead of seven conventional steps resulting in a much faster linkage over the conventional linkage systems. Furthermore, since all users use the same smart search framework behind one click, relationship creation is consistent and less error prone.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENT OF THE INVENTION

Referring now to the drawings, and more particularly to FIGS. 1-5, there are shown exemplary embodiments of the method and structures according to the present invention.

Exemplarily, one-click linkages are provided through the following steps of providing a smart search framework capable of searching for relationship candidates that can be customized depending on business requirements and master data domain. The smart search framework exploits context, for example, if a new party (employee, customer, organization, etc.) is created, a different algorithm is used compared to the process when a new product master data record is created.

Exemplarily, new candidates are automatically offered linkages when the record is opened a next time by sensing a "re-open" context. The different users that create and maintain master data can perform different roles and the role context of these users as logged into the system may be exploited as well.

Exemplarily, some users might only have the permission to view relationship information but not to change it (e.g., no write access). Some users might only have the permission to create/change relationship information on a subset of the master data entities. The exemplary smart search framework supports customization options for the attributes considered for the relationship candidate search. The smart search framework can support wild card characters for fuzzy search, for example. The smart search would also support standardization operations while searching (e.g. "Bob", "Robert", etc. find "Robert").

A user interface (UI) with appropriate user controls is exemplarily provided to enable the One Click Creation approach for relationships between two master data records. The UI would exploit the smart search framework on creation of a new master data record as well as opening an existing master data record, when opening the maintenance screen for relationships.

As a result, exemplary aspects of the present invention have the following advantages over conventional linkages: reducing maintenance time for maintaining relationship information which reduces the total cost overall of master data management solution, improved data quality because there are fewer errors, all relevant relationships are maintained and none is forgotten, improved data insight, and consistency is provided across all users since all use the same algorithms because the algorithms are provided by the smart search framework.

Exemplarily, relationship information is crucial to optimize cross-sell and up-sell as well as to reduce customer chum. For example, many insurance types are offered on a house-hold basis because offering the insurance to all family members is often perceived as annoying and can cause customer churn. In an additional example, cross-selling and up-selling may require additional insight as to which products a customer/house-hold does not yet have. Therefore, understanding relationships between products or between family members is crucial in business settings. In an online store example, "a customer who bought this product also bought this other product" is another exemplary strategy supporting cross-selling.

Furthermore, relationship information is crucial for certain legal considerations. For example, in a medical scenarios where a legal guardianship for children is an issue, relationship information that can determine who can make decisions for the child regarding medical treatment in hospital is important. In a financial example, the opening a bank account for child/teenager would also require additional parental/guardianship relationship information.

Figure 1:
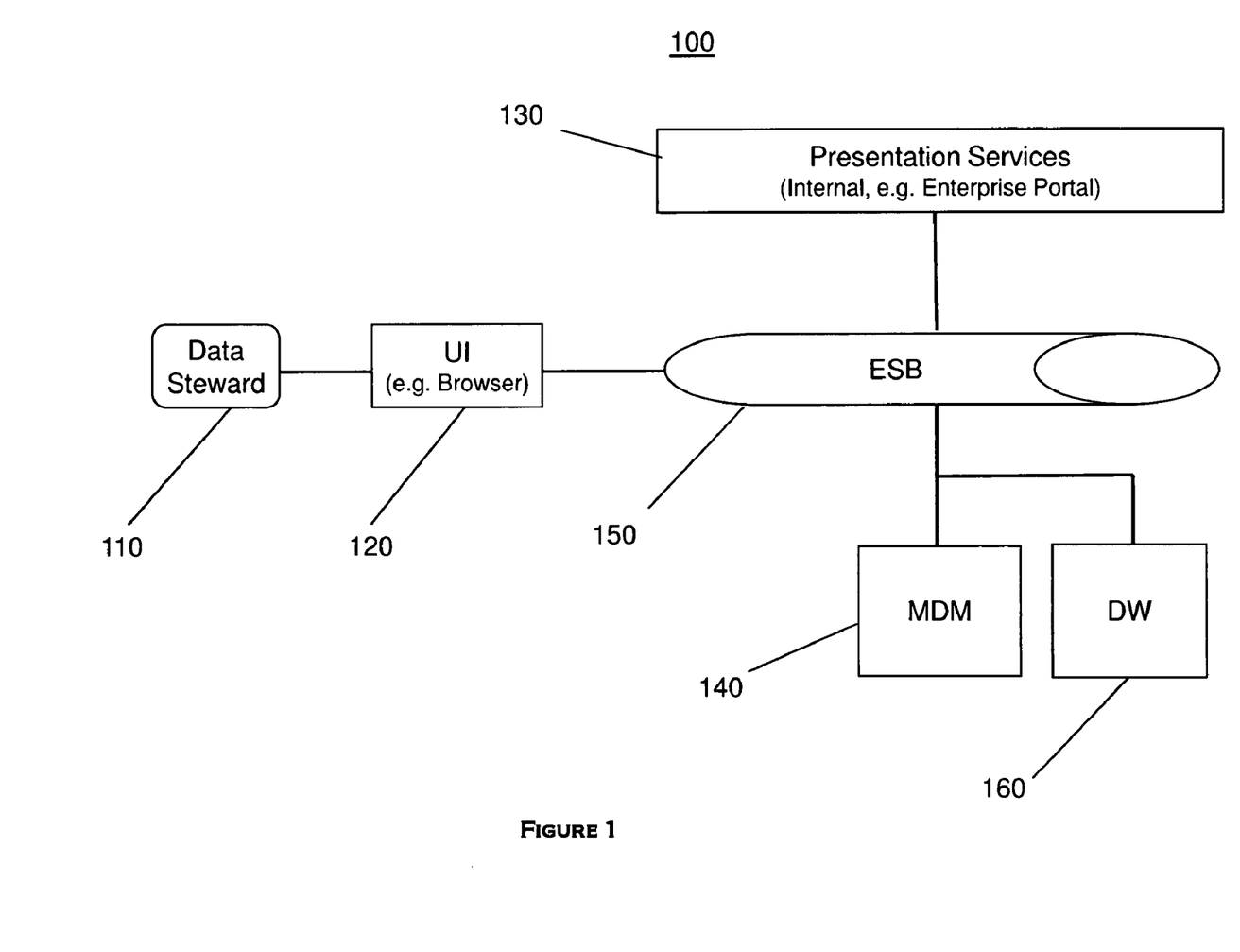
FIG. 1 illustrates exemplary system 100 for implementing the master data record interlinking.

FIG. 1 illustrates an exemplary system 100 for determining interrecord relationships. System 100 may include data steward 110, such as a user, data steward 100 would be using a User Interface 120. User interface 120 may be, for example, a browser. System 100 would exemplarily include presentation services component 130 that provides user 110 with the necessary user interface components at user interface 120 to create and maintain master data records.

Exemplarily, these master data services are provided by master data management system 140 and are invoked by presentation services 130. Master data management system 140 would exemplarily have a relational database for storing master data entities. Exemplary versions of a smart search framework can be deployed on presentation services component 130 or the master data management system 140, depending on an embodiment configuration.

Exemplarily, system 100 would also include enterprise service bus 150. For example, in one embodiment, the enterprise service bus 150 may be a full-blown enterprise service bus implementation as provided by a market leading product such as WebSphere MQ or WebSphere Enterprise Service Bus.

In addition, system 100 would also exemplarily include data warehouse 160. Data warehouse 160 is an exemplary analytical system that may be used to determine various marketing issues, such as which cross-selling and up-sell strategies were successful, for example. Based on the insight provided by data warehouse 160, suggestions such as which customer is a good candidate for a certain product in a cross-sell or up-sell strategy could be the basis for creating relationships of the type "product X is cross-/up-sell candidate for customer Y". This candidate for a relationship is then persisted in master data management system 140 and offered through the presentation services to the user 110. If the user 110 accepts the relationship, this could trigger, for example, that a sales person get notified to approach this customer to attempt to sell a product or that, when the customer visits the online store in the customer account again, a determined product is shown to the customer.

Figure 2:
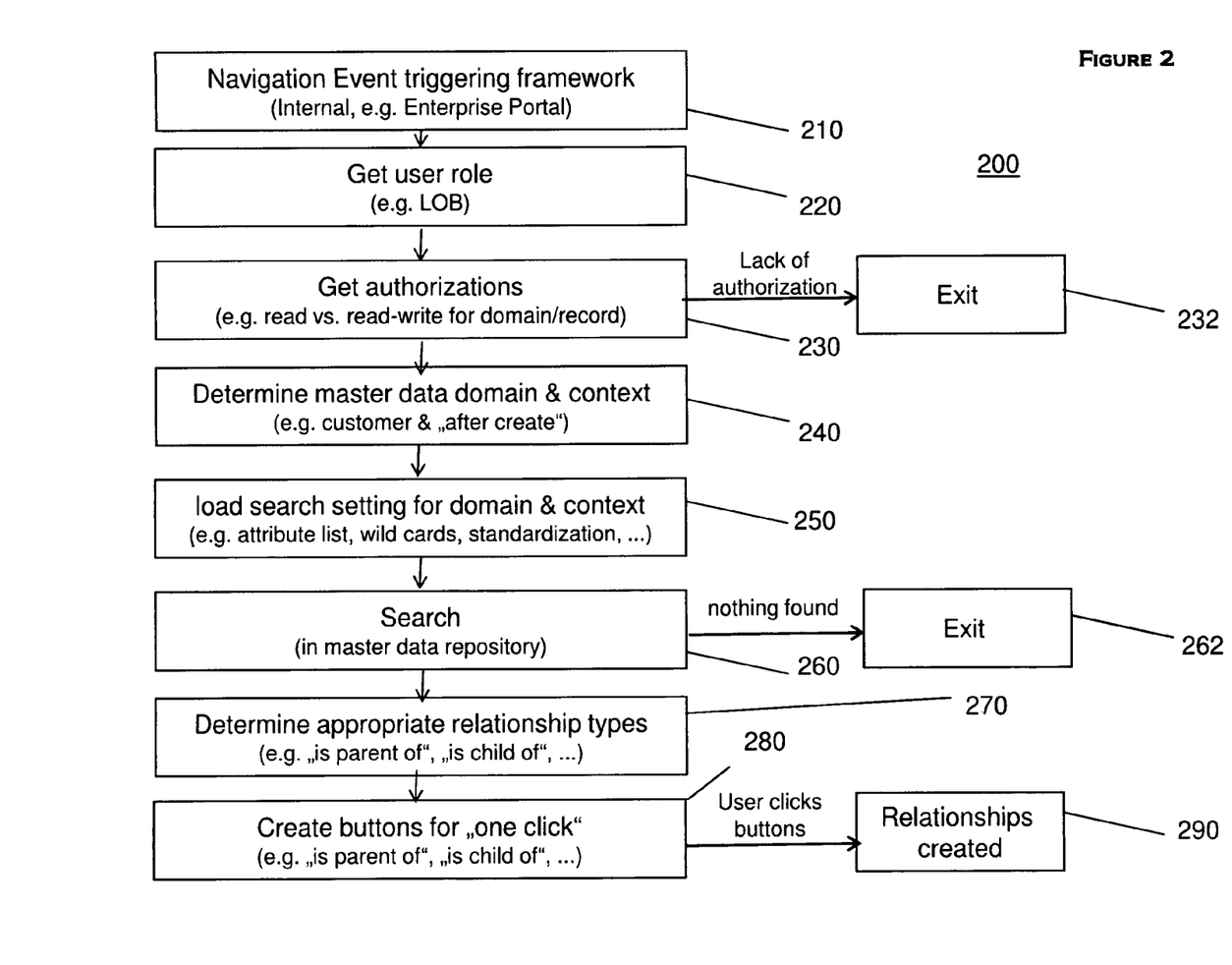
FIG. 2 illustrates exemplary method 200 for inter-linking master data records.

FIG. 2 illustrates an exemplary embodiment of method 200 for creating and persisting interrecords. In Step 210, a navigation event request occurs. Exemplarily, a smart search framework is running in the background of a user's computer while the next screen is loaded. In Step 220, the user's role would be determined. That is, the smart search framework starts and picks the user role from the execution context. In Step 230, for a detected user role, authorization privileges are determined where a create/change relationship operation is to be performed on the given master data entity. And if there is proper authorization, the creation or editing of the record is allowed for the user. However, in Step 232, if insufficient authorizations are detected, the smart search exits and returns an error with appropriate error message to calling navigation event.

Where sufficient authorizations are detected, the master data domain and context is determined in Step 240. Exemplarily, master data domains may include product, customer, account, contract, location, etc. In addition, the context can be, for example, "after create" meaning a navigation event to the result screen of a create operation or an "open record" if a master data record is supposedly opened after a search from a result list. In addition, the user may also be a context item. That is, the user manipulating the data record may be important in determining the interrelations.

In Step 250, search settings and appropriate methods for domain and context means for the smart search framework are loaded. Exemplarily, depending on the master data domain, different attributes must be considered to search for candidates for a relationship, e.g. for the customer domain attributes such as last name, address and gender could be possible fields to identify relationships for "is spouse of" or is "child of"—the same fields may not even exist in the product domain.

Furthermore, depending on the master data domain, different relationship types can exist which require different search attributes in the search method. These relation types may include, for example a relationship type "parent of" where last name and address attributes might be sufficient. In another example, a relationship type of "is grand-parent of" may not be optimal because the last name might not necessarily be a good candidate for an attribute. That is, if the parent changed the last name to the last name of the spouse as part of the marriage parent of this parent could not be found anymore using last names.

Thus, in the "is grand-parent of" scenario, the search might include first determining possible candidates for parents of the customer for a "parent of" relationship. And then, for each candidate for the "parent of" relationship, checking if for the candidate already customers exist with a parent of-relationship. After this determination, offering candidates for "is grand-parent of" all customers in an established "parent of" relationship to a candidate for a parent. Of course, not all applicable search methods for a master data domain might require execution. Thus, exemplarily, the search would have to consider certain special conditions.

That is, exemplarily, settings for these searches can vary based on the master data domain, including a required degree of fuzziness and standardization. That is, the search may be instructed to use only standardized names or addresses which are applicable in certain domains only, e.g., in the customer domain. For example, a phonetic search may be turned on/off because, in certain domains only, e.g., in the customer domain, a phonetic search would not be proper. Other domains may exemplarily be searched as well, such as a location domain.

The smart search framework would exemplarily leverage currently available information, either from the processed master data record, or from the processing context such as user role, user situation, and master data record or customer information. Exemplarily, the candidates may be both potential and implicitly proposed. The candidates are proposed by potential because it is not yet determined whether there really is a relationship. That fact has to be determined by the user. The candidates are also implicitly proposed because the user does not need to explicitly search for the candidates, but the smart search framework takes the context information and data from the processed master data object to find suitable candidates which may already have or may not already have been shown to have a connection or relationship with the processed master data record.

In Step 260, a search is performed in the master data repository by all applicable methods with all applicable configurations/settings. If search result is empty, Step 262 would exit with message to navigation event that no result was found. On the other hand, if the search result is not empty, for each candidate, in Step 270, it should be determined if there is at least one applicable relationship which is not yet created. That is, exemplarily, a candidate list is created. In Step 270, if all applicable relationships exist, the candidate would be removed from the candidate list.

Otherwise, in Step 280, the possible relationship types would be assigned. In particular, in Step 280, appropriate buttons for the found possible relationships are created in a user's interface. Therefore, if the user clicks on possible relationship button, relationships are created as illustrated in Step 290.

Figure 3:
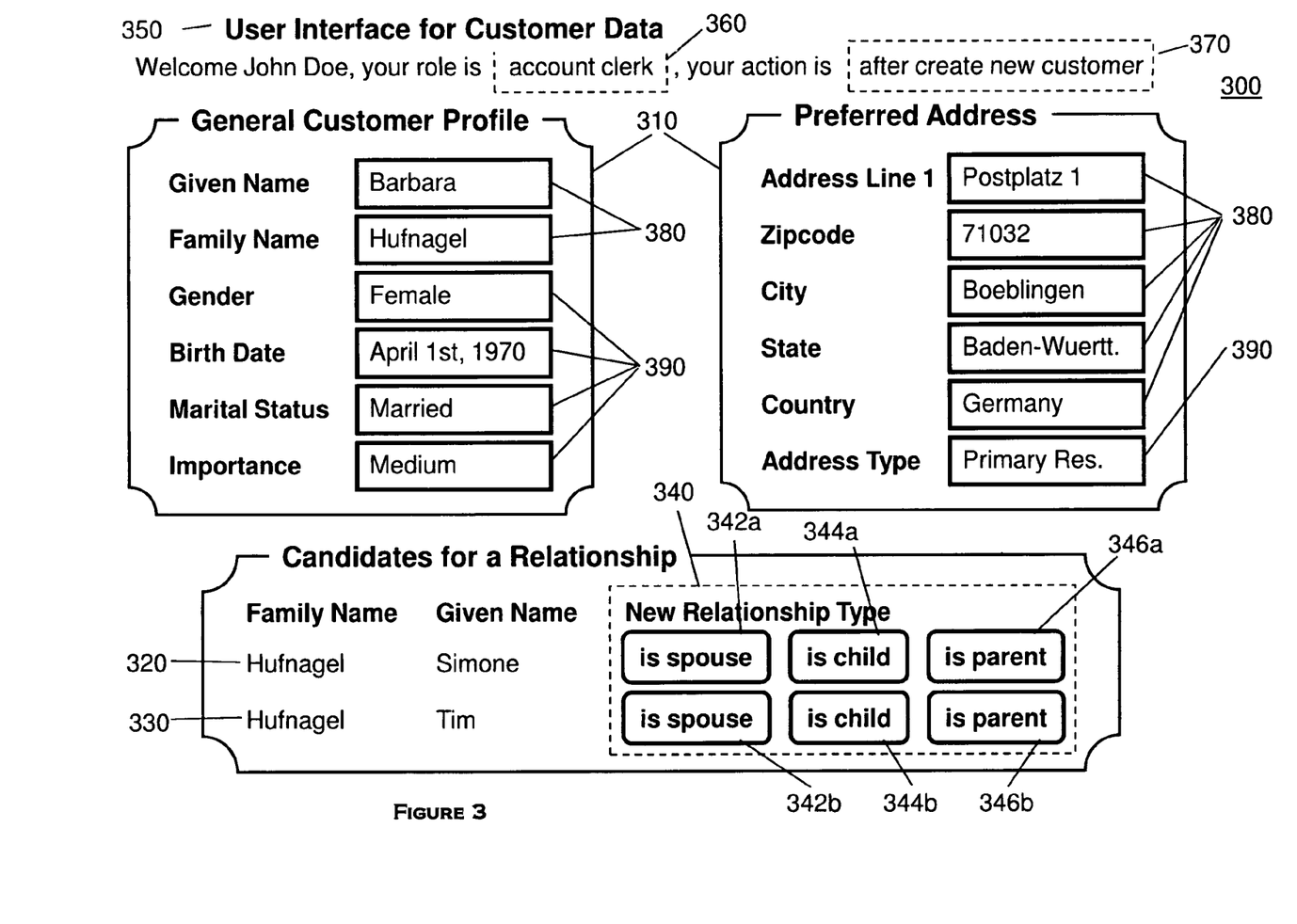
FIG. 3 illustrates a screen shot 300 of an exemplary user interface.

FIG. 3 illustrates an exemplary user interface 300. Referring to FIG. 3, a user created a new customer—Barbara Hufnagel as illustrated by element number 310. When the creation is complete, the user interface would exemplarily navigate the user to an overview screen showing the result of the creation as illustrated by user interface 300. In this example, the exemplary smart search framework found other customers which are considered candidates for a relationship, Simone Hufnagel 320 and Tim Hufnagel 330.

In user interface 300, an exemplary smart search framework should also return possible relationship types represented in the user interface with buttons 340 to click. In this example, buttons 340 would include the options of "is spouse of" 342a, "is child of" 344a, and "is parent of" 346a for a person that may be related to Simone Hufnagel 320 and the options of "is spouse of" 342b, "is child of" 344b, and "is parent of" 346b related to Tim Hufnagel 330.

Exemplarily, the user has the option by clicking just one of buttons 340 to establish the relationships for the new data record of Barbara Hufnagel 310. In this outcome, the selecting of buttons 342b creates a consistent and complete household. Reference Number 350 illustrates that the master data domain is that of "customer."

Exemplarily, a role for the user would also be provided in the user interface. For example, user "John Doe's" role is that of account clerk as illustrated by reference element 360. Reference element 370 illustrates type of interaction: create new party. Then reference element 380 illustrates a navigation event 380—master data attributes of processed record that are used for smart search example 390—master data attributes of processed record that are not used for the described smart search example, but that may be used for other smart searches.

Figure 4:
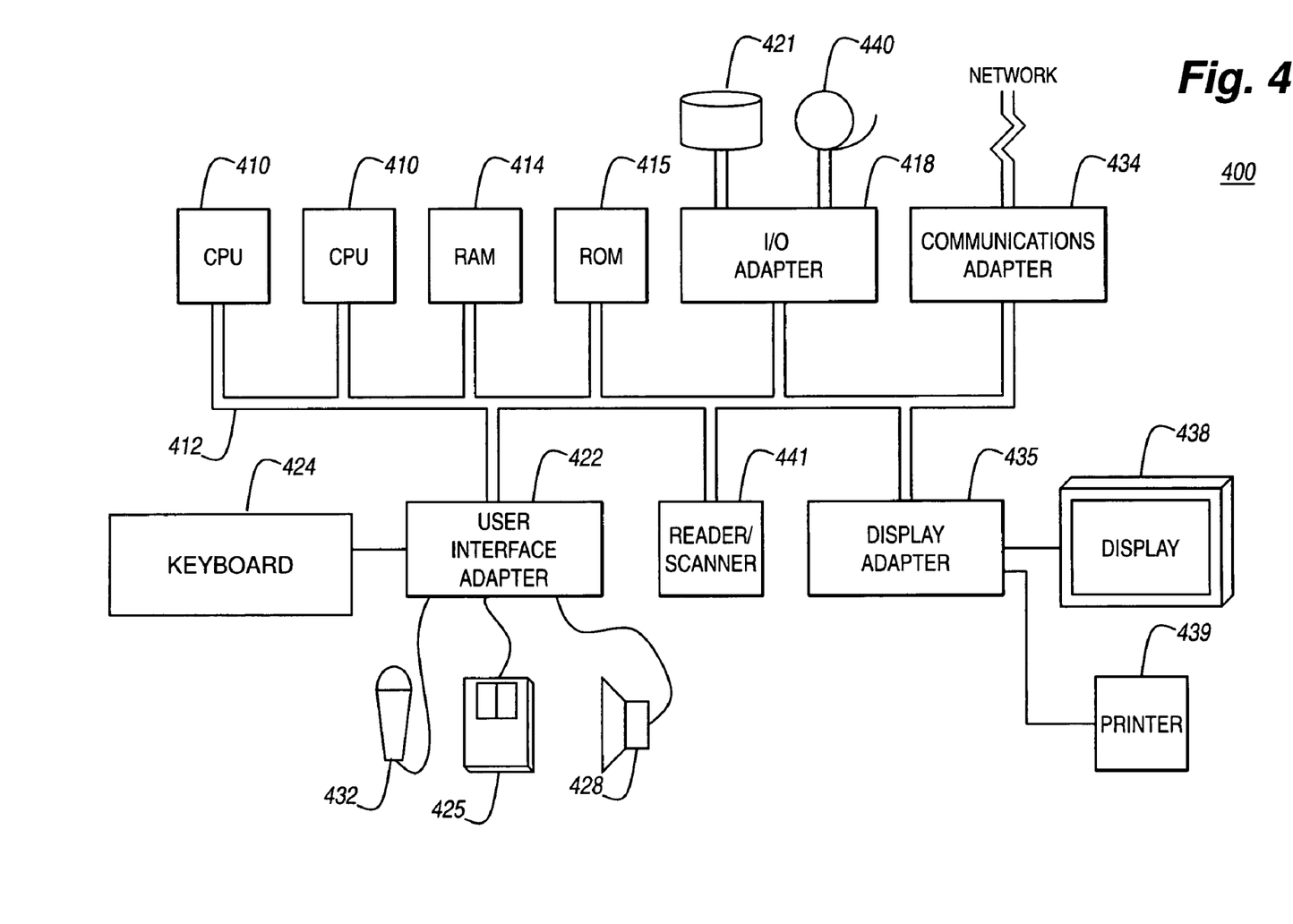
FIG. 4 illustrates a typical hardware configuration which may be used for implementing the computer system and method according to the exemplary aspects of the present invention.
Figure 5:
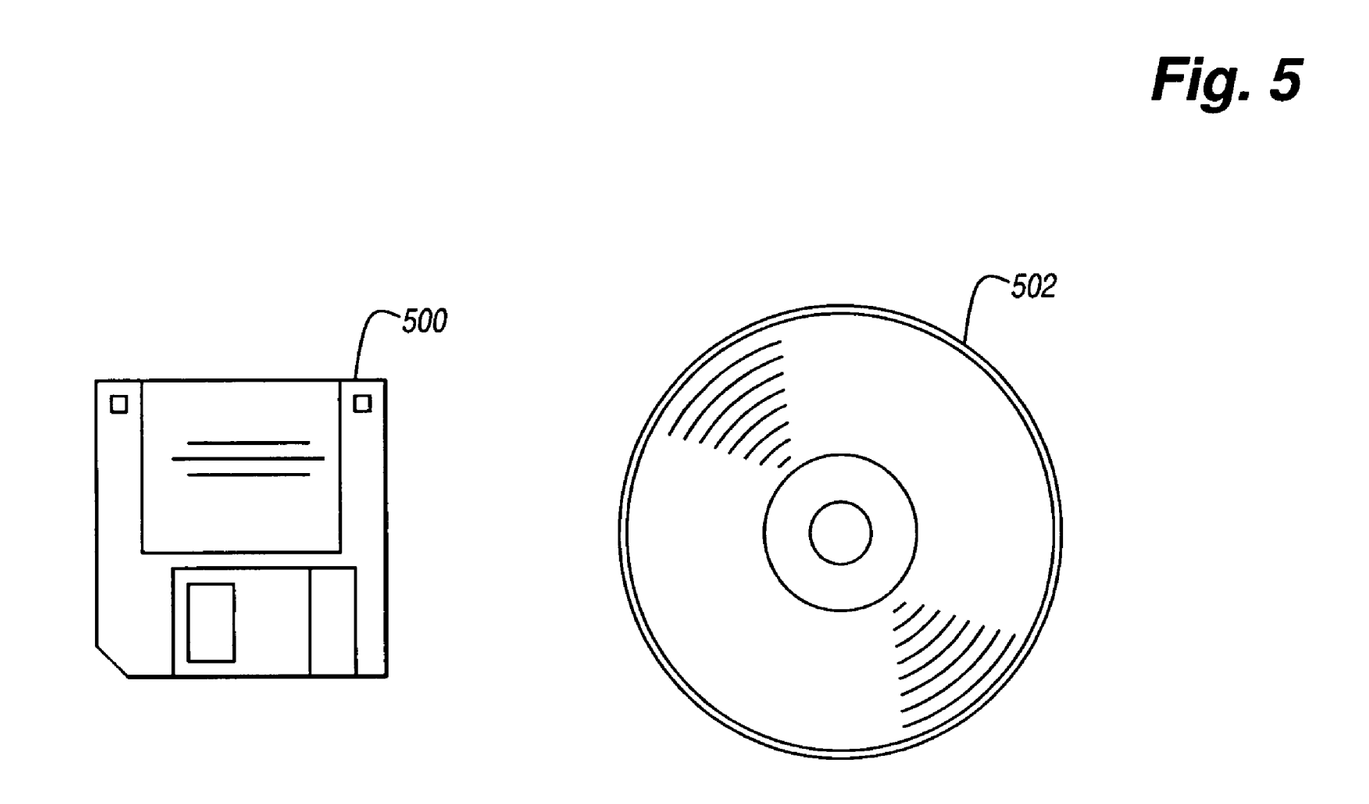
FIG. 5 illustrates a magnetic data storage diskette 500 to store the method 100.

Referring now to FIG. 4, system 400 illustrates a typical hardware configuration which may be used for implementing the inventive system and method for buying and selling merchandise. The configuration has preferably at least one processor or central processing unit (CPU) 410. The CPUs 402 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, and Intranet, a personal area network (PAN), etc., and a display adapter 436 for connecting the bus 412 to a display device 438 and/or printer 439. Further, an automated reader/scanner 441 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Thus, this aspect of the present invention is directed to a programmed product, comprising signal-bearing media tangibly embodying a program of machine-readable instructions executable by a digital data processor incorporating the CPU 410 and hardware above, to perform the method of the invention.

This signal-bearing media may include, for example, a RAM contained within the CPU 410, as represented by the fast-access storage for example. Alternatively, the instructions may be contained in another signal-bearing media, such as a magnetic data storage diskette 500 or CD-ROM 502, (FIG. 5), directly or indirectly accessible by the CPU 410.

Whether contained in the computer server/CPU 410, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent as follows:

1. A method to create interrecord relationships between master data records, said master data records having a relational database for storing master data entities, the method comprising:

processing a master data record, the processing comprising one of receiving a new master data record and editing an existing master data record;

determining a role of a user processing the master data record and ending the method if the user does not possess an adequate authorization;

searching a plurality of master data records in the relational database for candidates that have a potential of being related to the processed master data record, said searching being performed implicitly and said searching comprising a search parameter having context information;

determining a first potential relationship type to be established as an interrecord relationship between the processed master data record and a first potential candidate master data record from among the potential candidate master data records found as a result of the searching;

presenting the determined first potential relationship type and the first potential candidate master data record to the user;

establishing the determined first potential relationship type as an interrecord relationship between the processed master data record and the first potential candidate master data record, through a single action by the user in response to and after the presenting the determined first potential relationship type and the first potential candidate master data record to the user; and persisting the determined first potential relationship type in the master data record if established by the user through the single action, wherein the relational database does not store the first potential relationship type between the processed master data record and the first potential candidate master data record, prior to the processing, and wherein the first potential relationship type is determined independent of interrecord information stored in the relational database identifying a relationship between the first potential master data record and the first potential candidate master data record and linking the first potential master data record and the first potential candidate master data record, prior to the determination.

2. A method for creating interrecord relationships between master data records stored in a relational database, the method comprising:

automatically searching a plurality of master data records in the relational database for candidate master data records that have a potential of being related to a first master data record, the searching performed automatically in response to one of receiving information for the first master data record and editing of the first master data record;

determining a first relationship type to be established as an interrecord relationship between a first candidate master data record found as a result of the searching and the first master data record;

presenting the determined at least one relationship type, and the first candidate master data record to the user;

establishing the determined relationship type as an interrecord relationship between the first master data record and the first candidate master data record in response to a single action selection by the user after the determined first relationship type and the first candidate master data record are presented to the user, wherein the relational database does not store the first relationship type as an interrecord relationship between the first master data record and the first candidate master data record, prior to the searching, and wherein the first relationship type is determined independent of interrecord information stored in the relational database identifying a relationship between the first master data record and the first candidate master data record and linking the first master data record and the first candidate master data record, prior to the determination.

3. The method according to claim 2, wherein the searching is based on a master data domain and attributes specific to the master data domain.

4. The method according to claim 3, further comprising determining privileges of the user prior to the searching and ending the method in response to the user not possessing adequate privileges.

5. The method according to claim 3, wherein the first relationship type and the first candidate master data record are presented to the user via a user interface, the user interface including an option for establishing the interrecord relationship between the first master data record and the first candidate master data record in response to the single action by the user.

6. The method according to claim 3, wherein the first relationship type is determined based on the master data domain.

7. The method according to claim 3, wherein the searching is further based on a context information.

8. The method according to claim 7, wherein the context information is a user role.

9. The method according to claim 7, wherein the context information is a navigation event initiated by the user for creating the first master data record.

10. The method according to claim 2, wherein the relational database does not store any relationship linkage between the processed master data record and the first potential candidate master data record, prior to the establishing the determined first relationship type as an interrecord relationship between the processed master data record and the first potential candidate master data record.

11. The method according to claim 2, wherein when a creation or the editing of the first master data record is complete, an user interface automatically navigates the user to an overview screen with a button corresponding to the first relationship type to prompt the user to perform the single action selection.

12. A computer program product for creating interrecord relationships between master data records stored in a relational database, the computer program product comprising:

a computer readable storage medium having computer readable program code embodied therewith, the computer readable program code comprising:

computer readable program code configured to receive information for a first master data record from a user;

computer readable program code configured to search a plurality of master data records in the relational database for candidate master data records that have a potential of being related to the first master data record, the searching performed automatically in response to the receiving;

computer readable program code configured to determine a first relationship type to be established as a relationship type between a first candidate master data record found as a result of the searching and the first master data record;

computer readable program code configured to present the determined first relationship type, and the first candidate master data record to the user; and computer readable program code configured to establish the determined first relationship type as an interrecord relationship between the first master data record and the first candidate master data record through a single action selection by the user after the determined first relationship type and the first candidate master data record are presented to the user, wherein the relational database does not store the first relationship type as an interrecord relationship between the first master data record and the first candidate master data record, prior to the searching, and wherein the first relationship type is determined independent of interrecord information stored in the relational database identifying a relationship between the first master data record and the first candidate master data record and linking the first master data record and the first candidate master data record, prior to the determination.

13. The computer program product according to claim 12, wherein the searching is based on a master data domain and attributes specific to the master data domain.

14. The computer program product according to claim 13, wherein the determined first relationship type and the candidates found as a result of the searching are presented to the user via a user interface, the user interface including an option for establishing the interrecord relationship between the first master data record and at least one of the candidates found as a result of the searching in response to the single action by the user.

15. The computer program product according to claim 13, wherein the at least one potential relationship type is determined based on the master data domain.

16. The computer program product according to claim 13, wherein the searching is further based on a context information.

17. The computer program product according to claim 16, wherein the context information is one of a user role and a navigation event initiated by the user for creating the first master data record.

18. A system for creating interrecord relationships between master data records stored in a master data management system, the system comprising:

a first processor operable to receive information for a first master data record from a user;

the first processor further operable to search a plurality of master data records in the master data management system for candidate master data records that have a potential of being related to the first master data record, the searching performed automatically in response to the receiving;

the first processor further operable to determine a first relationship type to be established between a first candidate master data record found as a result of the searching and the first master data record;

a presentation service component operable to present the determined first relationship type, and the first candidate master data record to the user for establishing the determined first relationship type as an interrecord relationship between the first master data record and the first candidate master data record through a single action selection by the user after the determined first relationship type and the first candidate master data record to the user are presented to the user, wherein the master data management system does not store the first relationship type as an interrecord relationship between the first master data record and the first candidate master data record, prior to the searching, and wherein the first relationship type is determined independent of interrecord information stored in the relational database identifying a relationship between the first master data record and the first candidate master data record and linking the first master data record and the first candidate master data record, prior to the determination.

19. The system according to claim 18, wherein the searching is based on a master data domain and attributes specific to the master data domain.

20. The system according to claim 18, wherein the presentation service component is operable to provide a user interface including an option for establishing the interrecord relationship between the first master data record and the first candidate master data record in response to the single action by the user.

* * * * *